Oct. 7, 1969    J. R. BENFORD ET AL    3,471,218
FLAT FIELD APOCHROMATIC OBJECTIVE 7.5X, .20N.A.
Filed March 26, 1968

JAMES R. BENFORD
HAROLD E. ROSENBERGER
INVENTORS

BY [signature]

AGENT

United States Patent Office 3,471,218
Patented Oct. 7, 1969

3,471,218
FLAT FIELD APOCHROMATIC OBJECTIVE 7.5×, .20 N.A.
James R. Benford, Irondequoit, and Harold E. Rosenberger, Brighton, N.Y., assignors to Bausch & Lomb Incorporated, Rochester, N.Y., a corporation of New York
Filed Mar. 26, 1968, Ser. No. 716,006
Int. Cl. G02b 9/60
U.S. Cl. 350—216                    5 Claims

ABSTRACT OF THE DISCLOSURE

An apochromatic microscope semiobjective having substantially 1.5× magnification per se, which is designed for use with an associated negative field flattening lens having substantially 5.0× magnification per se so as to produce cooperatively a total magnification of substantially 7.5× per se and a numerical aperture of 0.20. The semiobjective is one of a set of such semiobjectives of different powers which are used interchangeably with the field flattening lens.

BACKGROUND OF THE INVENTION

This invention is related to microscope optical systems and is more particularly concerned with improvements in the objective system thereof.

A semiobjective of the kind described hereinbelow is intended for use in cooperative association with a plurality or set of other related semiobjectives in a rotatable microscope nosepiece, the individual semiobjectives having different respective magnifications covering a large range of image magnification varying from low to high power, each such semiobjective being corrected aberrationwise together with a single stationary prescribed negative corrector lens which is so constructed as to produce the best practical overall correction of the aberrations for the entire set of semiobjectives and to act as a field flattener. In particular, the instant semiobjective together with the negative corrector lens is corrected aberrationwise for four different wavelengths of light, red, green, blue, and violet, in a low power lens system.

With regard to the prior art, the microscope objective most nearly approaching the general optical structure disclosed herein is shown in copending application Ser. No. 408,875, now abandoned, by Harold E. Rosenberger which is assigned to the same assignee as the present application. However, there are a number of distinguishing features between the respective lens systems and the characteristics thereof. Initially, subject invention is an apochromatic lens system, while the objectives disclosed in the copending application are achromats. This additional and formidable feature of the present invention necessarily distinguishes it from the objectives disclosed in the copending application. The advantages to the operator gained by this additional chromatic correction are obvious and need not be discussed herein.

Additionally, the aforementioned prior art objectives are of different powers of magnifications, 4.0×, 10.0×, 40.0×, and 100.0×, than is the objective of the present application, 7.5×. Also, the numerical aperture of the present invention is 0.20, while the numerical aperture for the previously disclosed objectives are, for example, 0.09 for the 4.0× and 0.25 for the 10.0×.

This objective has been designed to be placed into a microscope of the type disclosed in the aforementioned copending application and constitutes one of a particular group of objectives designed to cooperatively operate in the manner described therein.

SUMMARY OF THE INVENTION

It is, therefore, an object of the invention to provide a microscope objective having substantially 7.5× magnification per se, with a numerical aperture of 0.20.

It is a second object of the invention to provide such a microscope objective having superior chromatic and spherical aberration correcting qualities so as to result in an apochromatic lens system.

It is another object of the present invention to provide a microscope semiobjective having substantially 1.5× magnification capable of use in cooperative association with a related plurality of set of other microscope semiobjectives of different powers of low to high magnification in a rotatable microscope nosepiece with a common negative field flattening and aberration correcting lens having substantially 5.0× magnification per se.

It is a further object of the present invention to provide such a microscope objective lens system which cooperatively produces an excellent flat field and substantially corrects other image aberrations including secondary spectrum, Petzval condition, coma, and astigmatism; the construction thereof being comparatively economical when compared to micro-objectives of comparable performance.

Briefly, the invention in its broadest aspect comprises a front singlet positive meniscus lens member (I) which is located adjacent to a specimen surface to be examined at an axial distance designated $S_1$ therefrom. A first positive doublet lens member (II) is located at an axial distance designated $S_2$ rearwardly of lens member I. Member II includes a front negative meniscus lens element (IIa) which lies in surface contact with a rear double convex lens element (IIb). A second positive doublet lens member (III) is located at an axial distance designated $S_3$ rearwardly of lens member II. Member III includes a front double convex lens element (IIIa) which lies in surface contact with a rear negative meniscus lens element (IIIb). A rear singlet double convex lens member (IV) is located at an axial distance designated $S_4$ rearwardly of lens member III. The lens member IV is located at an axial distance designated $S_5$ from the aforementioned negative field flattening lens member (V) which includes a front double convex lens element (Va) which lies in surface contact with a rear double convex lens element (Vb).

The ranges of values for the constructional data and the properties of the glasses to be used in the lens system are as specified in the tables hereinbelow.

Further objects, advantages, and features of the invention will be apparent in the arrangement and construction of the constituent parts as set forth in detail in the following specification taken together with the accompanying drawing.

DESCRIPTION OF THE PREFERRED EMBODIMENT

Figure 1:
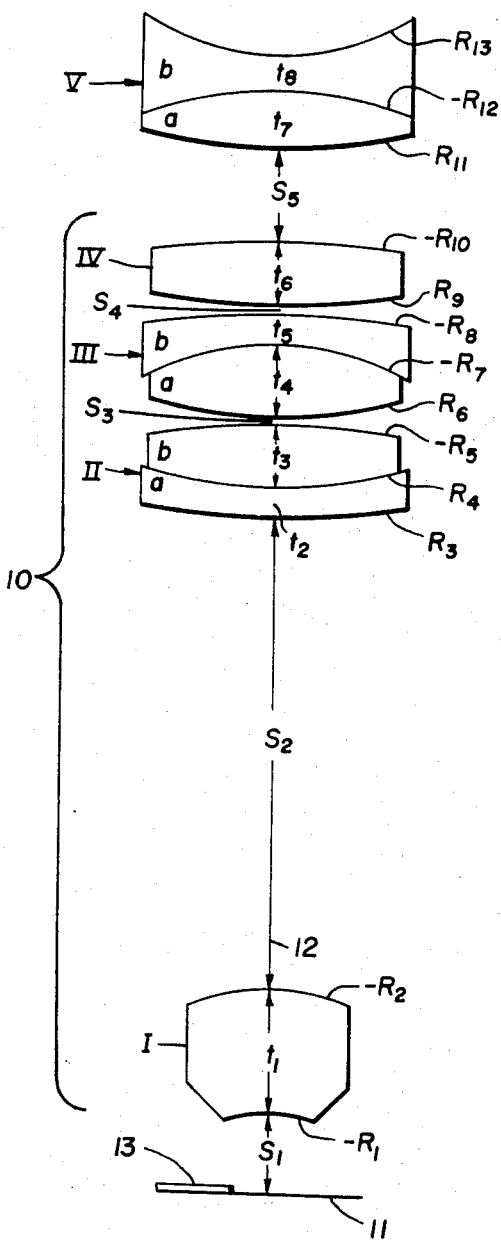
FIGURE 1 is an opical diagram showing a preferred embodiment of the present invention.

In the preferred embodiment of the present invention, shown in FIGURE 1, there is provided a semiobjective for a microscope, which is shown generally by reference numeral 10 and it comprises a front meniscus singlet lens member I having a positive focal length designated F(I). On lens member I, there is provided a front lens surface $-R_1$ which is concave toward a specimen surface 11 and is spaced therefrom by an axial distance designated $S_1$.

The objective provides for the usage of a cover slip 13, which generally is 0.011F in thickness. The rear surface of lens member I is also concave toward surface 11 and is designated $-R_2$; however, lens surface $-R_2$ is comparatively more weakly curved than is lens surface $-R_1$. Surface $-R_1$ is spaced from surface $-R_2$ by an axial distance $t_1$.

It will be hereinafter understood that the use of a minus (−) sign with any R reference designation or value signifies that the center of curvature of the particular lens surface lies in front of the surface, i.e., the surface is concavely curved toward the specimen surface 11.

Rearwardly along an optical axis 12, there is provided a first positive doublet lens member II which is optically aligned with lens member I. Lens member II includes a negative front meniscus lens element IIa which lies in surface contact with a rear double convex lens element IIb. The front and rear lens surfaces of lens element IIa are designated $R_3$ and $R_4$, respectively, the rear surface $R_4$ being comparatively more strongly curved than $R_3$. The front surface $R_3$ is spaced a distance $S_2$ from lens member I along the optical axis 12. The rear surface of lens element IIb is designated $-R_5$. Lens elements IIa and IIb have axial thicknesses which are designated $t_2$ and $t_3$, respectively.

Spaced rearwardly of lens member II at an axial distance $S_3$ along axis 12 is a second positive doublet lens member III, which includes a front double convex lens element IIIa which lies in surface contact with a rear negative meniscus lens element IIIb. The front and rear lens surfaces of the doublet are designated $R_6$ and $-R_8$ respectively while the interfacing surface is designated $-R_7$. Lens surface $-R_7$ is more strongly curved than lens surface $-R_8$. Lens elements IIIa and IIIb have axial thicknesses which are designated $t_4$ and $t_5$, respectively.

At an axial distance $S_4$ rearwardly of lens member III is located a singlet positive lens member IV of double convex form having a comparatively more strongly curved front lens surface $R_9$ spaced axially by a distance $t_6$ from the more weakly curved rear lens surface $-R_{10}$.

At an axial distance $S_5$ rearwardly of lens member IV and optically aligned therewith, is the aforementioned field flattening and aberration correcting lens member V. The meniscus form and optical properties of lens member V are prescribed as stated hereinabove so that the best average correction of aberrations and field curvature is afforded by lens member V when used interchangeably with a plurality of semiobjectives having different magnifying powers within a range of 5× to 100×, for example. Lens member V includes a front positive double convex lens element Va which lies in surface contact with a rear negative double concave lens element Vb, the axial thicknesses thereof being designated $t_7$ and $t_8$ respectively. Doublet lens member V has front and rear lens surfaces which are designated $R_{11}$ and $R_{13}$ respectively while the interfacing lens surface is designated $-R_{12}$.

The constructional data determined for the final design of the semiobjective together with the negative corrector and field flattening lens member V is the result of careful calculation and experiment and is set forth in ranges of values which invariably produce a successful optical system, this data is set forth in the tables hereinbelow.

With regard to the optical parameters in Table I, it will be seen that the values of each parameter are given in ranges of values which include a nominal or ideal value. These ranges of values are prescribed for the primary purpose of facilitating the manufacture of the lens elements to commercial standards.

It is well known in the art that it is practically impossible to manufacture a run of lens elements economically while holding all of the lens parameters to specific ideal values. Therefore, the lens designer specifies limits or tolerances, i.e., ranges of values for each lens parameter within which the lens elements may be economically manufactured while still producing a completed objective or lens system which is capable of good and acceptable optical performance.

The technique used by the manufacturer is to separate out and classify the lens elements according to size increments which fall within the ranges of values and then selectively assemble from the lens classes a complete set of lens elements which are complementary to each other in reducing unwanted image aberrations. This technique is highly successful in producing economically, commercially acceptable optical objectives having good optical performance.

In Table I, herebelow, wherein the ranges of values of the constructional parameters are given, F(I), F(II), F(III), F(IV), and −F(V) represent the equivalent focal lengths of the successive lens members I, II, III, IV, and V, respectively, in terms of F, the equivalent focal length of the entire system of lenses. The equivalent focal length of the lens elements IIa, IIb, IIIa, IIIb, Va, and Vb are designated −F(IIa), F(IIb), F(IIIa), −F(IIIb), F(Va), and −F(Vb) respectively, the minus (−) sign meaning negative focal length. The other designations are as specified hereinabove.

TABLE I

| | | |
|---|---|---|
| 6.167F | <F(I) | <6.419F |
| 3.902F | <F(II) | <4.062F |
| 3.331F | <F(III) | <3.465F |
| 2.705F | <F(IV) | <2.815F |
| 1.951F | <−F(V) | <2.031F |
| 2.596F | <−F(IIa) | <2.702F |
| 1.562F | <F(IIb) | <1.626F |
| 1.203F | <F(IIIa) | <1.251F |
| 1.835F | <−F(IIIb) | <1.909F |
| 1.084F | <F(Va) | <1.128F |
| 0.656F | <−F(Vb) | <0.682F |
| 0.188F | <S_1 | <0.196F |
| 1.325F | <S_2 | <1.337F |
| 0.003F | <S_3 | <0.009F |
| 0.003F | <S_4 | <0.009F |
| 0.274F | <S_5 | <0.286F |
| 0.356F | <t_1 | <0.362F |
| 0.086F | <t_2 | <0.098F |
| 0.177F | <t_3 | <0.189F |
| 0.208F | <t_4 | <0.220F |
| 0.086F | <t_5 | <0.098F |
| 0.186F | <t_6 | <0.198F |
| 0.144F | <t_7 | <0.156F |
| 0.084F | <t_8 | <0.096F |
| 0.383F | <−R_1 | <0.387F |
| 0.497F | <−R_2 | <0.499F |
| 3.934F | <R_3 | <3.978F |
| 1.272F | <R_4 | <1.276F |
| 2.206F | <−R_5 | <2.224F |
| 1.500F | <R_6 | <1.508F |
| 0.788F | <−R_7 | <0.790F |
| 3.069F | <−R_8 | <3.101F |
| 2.069F | <R_9 | <2.083F |
| 4.307F | <−R_10 | <4.369F |
| 2.413F | <R_11 | <2.443F |
| 1.226F | <−R_12 | <1.230F |
| 0.632F | <R_13 | <0.634F |

Furthermore, the dimensionless numerical ranges of values are given in Table II herebelow for the refractive index $n_D$ and the Abbe number $\nu$ of the glasses used in the successive lens elements I to Vb.

TABLE II

| | | |
|---|---|---|
| 1.7486 | <n_D(I) | <1.7526 |
| 1.7185 | <n_D(IIa) | <1.7215 |
| 1.5130 | <n_D(IIb) | <1.5150 |
| 1.4328 | <n_D(IIIa) | <1.4348 |
| 1.5740 | <n_D(IIIb) | <1.5760 |
| 1.5130 | <n_D(IV) | <1.5150 |
| 1.7486 | <n_D(Va) | <1.7526 |
| 1.6115 | <n_D(Vb) | <1.6145 |
| 27.6 | <ν(I) | <28.0 |
| 29.1 | <ν(IIa) | <29.5 |
| 69.5 | <ν(IIb) | <70.9 |
| 94.5 | <ν(IIIa) | <95.9 |
| 41.1 | <ν(IIIb) | <41.7 |
| 69.5 | <ν(IV) | <70.9 |
| 27.6 | <ν(Va) | <28.0 |
| 43.9 | <ν(Vb) | <44.5 |

More specifically, Table III herebelow presents the substantially nominal values for the parameters stated in the preceding tables. The specific constructional data is given substantially in terms of F, and the glass properties $n_D$ and $\nu$ remain dimensionless numerical values.

TABLE III $F(I) = 6.293F$
$F(II) = 3.982F$
$-F(IIa) = 2.649F$
$F(IIb) = 1.602F$
$F(III) = 3.398F$
$F(IIIa) = 1.228F$
$-F(IIIb) = 1.872F$
$F(IV) = 2.760F$
$-F(V) = 1.991F$
$F(Va) = 1.106F$
$-F(Vb) = 0.669F$
$-F(IIa)/F(IIb) = 1.654$ subst.
$F(IIIa)/-F(IIIb) = 0.656$ subst.
$F(Va)/-F(Vb) = 1.653$ subst.

$S_1 = 0.192F$
$S_2 = 1.331F$
$S_3 = 0.006F$
$S_4 = 0.006F$
$S_5 = 0.280F$ $t_1 = 0.359F$
$t_2 = 0.092F$
$t_3 = 0.183F$
$t_4 = 0.214F$
$t_5 = 0.092F$
$t_6 = 0.192F$
$t_7 = 0.150F$
$t_8 = 0.090F$ $-R_1 = 0.385F$
$-R_2 = 0.498F$
$R_3 = 3.956F$
$R_4 = 1.274F$
$-R_5 = 2.215F$
$R_6 = 1.504F$
$-R_7 = 0.789F$
$-R_8 = 3.085F$
$R_9 = 2.076F$
$-R_{10} = 4.338F$
$R_{11} = 2.428F$
$-R_{12} = 1.228F$
$R_{13} = 0.633F$ $n_D(I) = 1.7506$
$n_D(IIa) = 1.7200$
$n_D(IIb) = 1.5140$
$n_D(IIIa) = 1.4338$
$n_D(IIIb) = 1.5750$
$n_D(IV) = 1.5140$
$n_D(Va) = 1.7506$
$n_D(Vb) = 1.6130$ $\nu(I) = 27.8$
$\nu(IIa) = 29.3$
$\nu(IIb) = 70.2$
$\nu(IIIa) = 95.2$
$\nu(IIIb) = 41.4$
$\nu(IV) = 70.2$
$\nu(Va) = 27.8$
$\nu(Vb) = 44.2$

Figure 2:
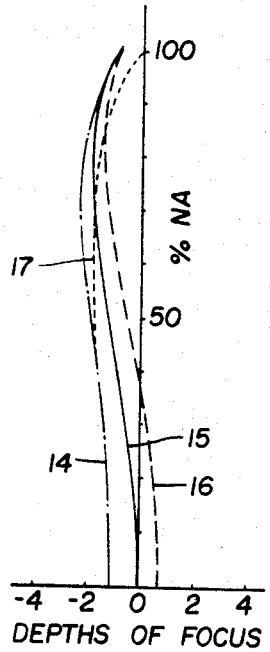
FIGURE 2 is a graphical representation of the performance of the complete micro-objective in correcting spherical and chromatic aberrations.

Referring now to FIGURE 2, there is shown plots of spherochromatism for the entire objective disclosed herein. Spherochromatism is the spherical aberration of the lens system using different monochromatic light sources, therefore, it is an excellent test for the degree of correction for both the spherical and the chromatic aberrations that is contained in the lens system.

It will be apparent, by reference to the plots, that the change in depth of focus from the center to the edge of the numerical aperture is very good for all of the four colors checked. It should be remembered that this is the criteria necessary for an apochromatic lens system, i.e., that it be corrected for spherical aberration and chromatic aberration for at least four different wavelengths of light. The greatest change in depth of focus occurs at approximately 70% of the numerical aperture on curve 14 using light of 4861 Angstrom unit wavelength, the Fraunhofer F line, and it totals only 2.3 depths of focus. The other curves 15, 16, and 17 for 5896 Angstrom wavelength light, the Fraunhofer D line, 6563 Angstrom wavelength light, the Fraunhofer C line, and 4340 Angstrom wavelength light, the Fraunhofer G' line; vary even less from the ideal condition.

While there has been shown and described in detail only one particular form of the present invention, it will be obvious to those skilled in the art that various changes and modifications may be made in the optical details within the ranges of values stated hereinabove without departing from the invention.

We claim:
1. A microscope semiobjective which is used in cooperation with a prescribed negative field flattening and aberration correcting lens (V) having 5× magnification per se, the negative lens being interchangeably used with each one of a set of semiobjectives having a range of different low to high powers, the semiobjectives being parfocalized to each other, the field flattening lens and semiobjective being designed to cooperatively produce a total image magnification of 7.5× and numerical aperture of 0.20, the semiobjective producing substantially 1.5× magnification per se, the equivalent focal length of the field flattening lens being designated $-F(V)$, the equivalent focal length of the semiobjective together with the field flattening lens being designated F, the semiobjective comprising:

a front singlet positive meniscus lens member (I) which is located adjacent to a specimen surface to be examined at an axial distance designated $S_1$ therefrom, a first positive doublet lens member (II) which is located at an axial distance designated $S_2$ rearwardly of lens member I, member II including a front negative meniscus lens element (IIa) which lies in surface contact with a rear double convex lens element (IIb), a second positive doublet lens member (III) which is located at an axial distance designated $S_3$ rearwardly of lens member II, member III including a front double convex lens element (IIIa) which lies in surface contact with a rear negative meniscus lens element (IIIb), a rear singlet double convex lens member (IV) which is located at an axial distance designated $S_4$ rearwardly of lens member III, lens member IV being located at an axial distance designated $S_5$ from the negative field flattening lens member (V) which includes a front double convex lens element (Va) which lies in surface contact with a rear double concave lens element (Vb), the ranges of values, in terms of F, for the constructional data by which the lens members and lens elements thereof I to Vb are formed being given in the first table hereinbelow, wherein F(I) to F(IV) designate the focal length of the successive lens members and $-F(V)$ designates the focal length of the negative field flattening lens, the minus (—) sign meaning negative focal length, the designations F(IIa), $-F(IIb)$, F(IIIa), $-F(IIIb)$, F(Va), and $-F(Vb)$ pertaining to the respective lens elements aforementioned, the designations $t_1$ to $t_8$ relating to the axial thicknesses of the successive lens members and elements, and the designations $S_1$ to $S_5$ being the successive interlens airspaces numbering from the specimen surface rearwardly, and

TABLE

| | | |
|---|---|---|
| 6.167F | <F(I) | <6.419F |
| 3.902F | <F(II) | <4.062F |
| 3.331F | <F(III) | <3.465F |
| 2.705F | <F(IV) | <2.815F |
| 1.951F | <−F(V) | <2.031F |
| | −F(IIa)/F(IIb) | =1.654 subst. |
| | F(IIIa)/−F(IIIb) | =0.656 subst. |
| | F(Va)/−F(Vb) | =1.653 subst. |
| 0.356F | <$t_1$ | <0.362F |
| 0.086F | <$t_2$ | <0.098F |
| 0.177F | <$t_3$ | <0.189F |
| 0.208F | <$t_4$ | <0.220F |
| 0.086F | <$t_5$ | <0.098F |
| 0.186F | <$t_6$ | <0.198F |
| 0.144F | <$t_7$ | <0.156F |
| 0.084F | <$t_8$ | <0.096F |
| 0.188F | <$S_1$ | <0.196F |
| 1.325F | <$S_2$ | <1.337F |
| 0.003F | <$S_3$ | <0.009F |
| 0.003F | <$S_4$ | <0.009F |
| 0.274F | <$S_5$ | <0.286F | the ranges of dimensionless numerical values for the refractive index $n_D$ relating to the glasses from which the successive lens elements I to Vb are made are given in the second table appearing herebelow.

| | | |
|---|---|---|
| 1.7486 | <$n_D$(I) | <1.7526 |
| 1.7185 | <$n_D$(IIa) | <1.7215 |
| 1.5130 | <$n_D$(IIb) | <1.5150 |
| 1.4328 | <$n_D$(IIIa) | <1.4348 |
| 1.5740 | <$n_D$(IIIb) | <1.5760 |
| 1.5130 | <$n_D$(IV) | <1.5150 |
| 1.7486 | <$n_D$(Va) | <1.7526 |
| 1.6115 | <$n_D$(Vb) | <1.6145 |

2. A microscope semiobjective as claimed in claim 1 wherein said glasses from which said successive lens elements I to Vb are made are further characterized by the ranges of dimensionless numerical values for the Abbe number $\nu$ as given in the third table appearing herebelow.

| | | |
|---|---|---|
| 27.6 | <$\nu$(I) | <28.0 |
| 29.1 | <$\nu$(IIa) | <29.5 |
| 69.5 | <$\nu$(IIb) | <70.9 |
| 94.5 | <$\nu$(IIIa) | <95.9 |
| 41.1 | <$\nu$(IIIb) | <41.7 |
| 69.5 | <$\nu$(IV) | <70.9 |
| 27.6 | <$\nu$(Va) | <28.0 |
| 43.9 | <$\nu$(Vb) | <44.5 |

3. A microscope semi-objective as claimed in claim 2 wherein the specific values, in terms of F, for the constructional data by which said lens members and lens elements thereof are formed being given substantially in the fourth table hereinbelow, wherein F(I) to F(IV) designate the focal lengths of said lens members and −F(V) designates the focal length of said field flattening lens, the minus (−) sign meaning negative focal length, the designation −F(IIa), $S_4 = 0.006F$
$S_5 = 0.280F$ wherein the specific values for the refractive index $n_D$ and the Abbe number $\nu$ relating to the glasses from which the successive lens elements I to Vb are made being given substantially in the fifth table appearing herebelow.

$n_D(I) = 1.7506$
$n_D(IIa) = 1.7200$
$n_D(IIb) = 1.5140$
$n_D(IIIa) = 1.4338$
$n_D(IIIb) = 1.5750$
$n_D(IV) = 1.5140$
$n_D(Va) = 1.7506$
$n_D(Vb) = 1.6130$
$\nu(I) = 27.8$
$\nu(IIa) = 29.3$
$\nu(IIb) = 70.2$
$\nu(IIIa) = 95.2$
$\nu(IIIb) = 41.4$
$\nu(IV) = 70.2$
$\nu(Va) = 27.8$
$\nu(Vb) = 44.2$

4. A microscope semiobjective which is used in cooperation with a prescribed negative field flattening and aberration correcting lens (V) having 5× magnification per se, the negative lens being interchangeably used with each F(IIb), F(IIIa), −F(IIIb), F(Va), and −F(Vb) pertaining to said respective lens elements aforementioned, the designations $t_1$ to $t_8$ represent the axial thicknesses of said successive lens elements numbering from the front, and $S_1$ to $S_5$ being the successive interlens airspaces numbering from said specimen surface rearwardly, and $F(I) = 6.293F$
$F(II) = 3.982F$
$F(III) = 3.398F$
$F(IV) = 2.760F$
$-F(V) = 1.991F$
$-F(IIa)/F(IIb) = 1.654$ subst.
$F(IIIa)/-F(IIIb) = 0.656$ subst.
$F(Va)/-F(Vb) = 1.653$ subst.

$t_1 = 0.359F$
$t_2 = 0.092F$
$t_3 = 0.183F$
$t_4 = 0.214F$
$t_5 = 0.092F$
$t_6 = 0.192F$
$t_7 = 0.150F$
$t_8 = 0.090F$ $S_1 = 0.192F$
$S_2 = 1.331F$
$S_3 = 0.006F$ one of a set of semiobjectives having a range of different low to high powers, the semiobjectives being parfocalized to each other, the field flattening lens and semiobjective being designed to cooperatively produce a total image magnification of 7.5× and numerical aperture of 0.20, the semiobjective producing substantially 1.5× magnification per se, the equivalent focal length of the field flattening lens being designated −F(V), the equivalent focal length of the semiobjective together with the field flattening lens being designated F, the semiobjective comprising;
  a front singlet positive meniscus lens member (I) which is located adjacent to a specimen surface to be examined at an axial distance designated $S_1$ therefrom,
  a first positive doublet lens member (II) which is located at an axial distance designated $S_2$ rearwardly of lens member I, member II including a front negative meniscus lens element (IIa) which lies in surface contact with a rear double convex lens element (IIb),
  a second positive doublet lens member (III) which is located at an axial distance designated $S_3$ rearwardly of lens member II, member III including a front double convex lens element (IIIa) which lies in surface contact with a rear negative meniscus lens element (IIIb),
  a rear singlet double convex lens member (IV) which is located at an axial distance designated $S_4$ rearwardly of lens member III,
  lens member IV being located at an axial distance designated $S_5$ from the negative field flattening lens member (V) which includes a front double convex lens element (Va) which lies in surface contact with a rear double concave lens element (Vb),
  the ranges of values, in terms of F, for the constructional data by which the lens members and lens elements thereof I to Vb are formed being given in the first table hereinbelow, wherein −$R_1$ to $R_{13}$ represent the successive radii of the lens surfaces formed on the lens members and lens elements thereof I to Vb numbering from the front, the minus (−) sign meaning that the lens surface so identified has its center of curvature located on the front side of the lens surface, the designations $t_1$ to $t_8$ relating to the axial thicknesses of the successive lens elements numbering from the front, and the designations $S_1$ to $S_5$ being the successive interlens airspaces numbering from the specimen surface rearwardly, and

| | | |
|---|---|---|
| 0.383F | $<-R_1$ | $<0.387F$ |
| 0.497F | $<-R_2$ | $<0.499F$ |
| 3.934F | $<R_3$ | $<3.978F$ |
| 1.272F | $<R_4$ | $<1.276F$ |
| 2.206F | $<-R_5$ | $<2.224F$ |
| 1.500F | $<R_6$ | $<1.508F$ |
| 0.788F | $<-R_7$ | $<0.790F$ |
| 3.069F | $<-R_8$ | $<3.101F$ |
| 2.069F | $<R_9$ | $<2.083F$ |
| 4.307F | $<-R_{10}$ | $<4.369F$ |
| 2.413F | $<R_{11}$ | $<2.443F$ |
| 1.226F | $<-R_{12}$ | $<1.230F$ |
| 0.632F | $<R_{13}$ | $<0.634F$ |
| 0.365F | $<t_1$ | $<0.362F$ |
| 0.086F | $<t_2$ | $<0.098F$ |
| 0.177F | $<t_3$ | $<0.189F$ |
| 0.208F | $<t_4$ | $<0.220F$ |
| 0.086F | $<t_5$ | $<0.098F$ |
| 0.186F | $<t_6$ | $<0.198F$ |
| 0.144F | $<t_7$ | $<0.156F$ |
| 0.084F | $<t_8$ | $<0.096F$ |
| 1.188F | $<S_1$ | $<0.196F$ |
| 1.325F | $<S_2$ | $<1.337F$ |
| 0.003F | $<S_3$ | $<0.009F$ |
| 0.003F | $<S_4$ | $<0.009F$ |
| 0.274F | $<S_5$ | $<0.286F$ | the ranges of dimensionless numerical values for the refractive index $n_D$ and the Abbe number $\nu$ relating to glasses from which the successive lens elements I to Vb are made being given in the second table appearing herebelow.

| | | |
|---|---|---|
| 1.7486 | $<n_D(I)$ | $<1.7526$ |
| 1.7185 | $<n_D(IIa)$ | $<1.7215$ |
| 1.5130 | $<n_D(IIb)$ | $<1.5150$ |
| 1.4328 | $<n_D(IIIa)$ | $<1.4348$ |
| 1.5740 | $<n_D(IIIb)$ | $<1.5760$ |
| 1.5130 | $<n_D(IV)$ | $<1.5150$ |
| 1.7486 | $<n_D(Va)$ | $<1.7526$ |
| 1.6115 | $<n_D(Vb)$ | $<1.6145$ |
| 27.6 | $<\nu(I)$ | $<28.0$ |
| 29.1 | $<\nu(IIa)$ | $<29.5$ |
| 69.5 | $<\nu(IIb)$ | $<70.9$ |
| 94.5 | $<\nu(IIIa)$ | $<95.9$ |
| 41.1 | $<(\nu(IIIb)$ | $<41.7$ |
| 69.5 | $<\nu(IV)$ | $<70.9$ |
| 27.6 | $<\nu(Va)$ | $<28.0$ |
| 43.9 | $<\nu(Vb)$ | $<44.5$ |

5. A microscope semiobjective as claimed in claim 4 wherein the specific values, in terms of F, for the constructional data by which said lens members and lens elements thereof I to Vb are formed being given substantially in the third table hereinbelow, wherein $-R_1$ to $R_{13}$ represent said successive radii of said lens surfaces formed on said lens elements I to Vb numbering from the front, the minus ($-$) sign meaning that the lens surface so identified has its center of curvature located on the front side of the surface, the designations $t_1$ to $t_8$ represent the axial thicknesses of said successive len elements numbering from the front, and $S_1$ to $S_5$ represent said successive interlens airspaces numbered from said specimen surface rearwardly, and $-R_1=0.385F$
$-R_2=0.498F$
$R_3=3.956F$
$R_4=1.274F$
$-R_5=2.215F$
$R_6=1.504F$
$-R_7=0.789F$
$-R_8=3.085F$
$R_9=2.076F$
$-R_{10}=4.338F$
$R_{11}=2.428F$
$-R_{12}=1.228F$
$R_{13}=0.633F$ $S_1=0.192F$
$S_2=1.331F$
$S_3=0.006F$
$S_4=0.006F$
$S_5=0.280F$ $t_1=0.359F$
$t_2=0.092F$
$t_3=0.183F$
$t_4=0.214F$
$t_5=0.092F$
$t_6=0.192F$
$t_7=0.150F$
$t_8=0.090F$ wherein the specific dimensionless numerical values for the refractive index $n_D$ and the Abbe number $\nu$ relating to the glasses from which said successive lens elements I to Vb are made being given substantially in the fourth table herebelow.

$n_D(I)=1.7506$
$n_D(IIa)=1.7200$
$n_D(IIb)=1.5140$
$n_D(IIIa)=1.4338$
$n_D(IIIb)=1.5750$
$n_D(IV)=1.5140$
$n_D(Va)=1.7506$
$n_D(Vb)=1.6130$ $\nu(I)-27.8$
$\nu(IIa)=29.3$
$\nu(IIb)=70.2$
$\nu(IIIa)=95.2$
$\nu(IIIb)=41.4$
$\nu(IV)=70.2$
$\nu(Va)=27.8$
$\nu(Vb)=44.2$

References Cited

UNITED STATES PATENTS 3,370,903   2/1968   Schwartz.
3,410,633   11/1968   Young.

DAVID SCHONBERG, Primary Examiner
PAUL A. SACHER, Assistant Examiner

UNITED STATES PATENT OFFICE
CERTIFICATE OF CORRECTION

Patent No. 3,471,218        Dated October 7, 1969

Inventor(s) James R. Benford and Harold E. Rosenberger

It is certified that error appears in the above-identified patent and that said Letters Patent are hereby corrected as shown below:

Column 4, line 47, (TABLE I), change "R" to -- $R_7$ --

Column 7, between lines 52-53, insert "F(IIb), F(IIIa), -F(IIIb), F(Va), and -F(Vb) pertaining to said respective lens elements aforementioned, the designations $t_1$ to $t_8$ represent the axial thicknesses of said successive lens elements numbering from the front, and $S_1$ to $S_5$ being the successive interlens airspaces numbering from said specimen surface rearwardly, and $$F(I) = 6.293 \ F$$
$$F(II) = 3.982 \ F$$
$$F(III) = 3.398 \ F$$
$$F(IV) = 2.760 \ F$$
$$-F(V) = 1.991 \ F$$

$$\frac{-F(IIa)}{F(IIb)} = 1.654 \ \text{subst.}$$

$$\frac{F(IIIa)}{-F(IIIb)} = 0.656 \ \text{subst.}$$

$$\frac{F(Va)}{-F(Vb)} = 1.653 \ \text{subst.}$$

$$t_1 = 0.359 \ F$$
$$t_2 = 0.092 \ F$$
$$t_3 = 0.183 \ F$$
$$t_4 = 0.214 \ F$$
$$t_5 = 0.092 \ F$$
$$t_6 = 0.192 \ F$$
$$t_7 = 0.150 \ F$$
$$t_8 = 0.090 \ F$$

$$S_1 = 0.192 \ F$$
$$S_2 = 1.331 \ F$$
$$S_3 = 0.006 \ F \ "$$

Column 8, delete lines 5-30, beginning with "F(IIb)," and ending with "$S_3$=0.006F"

Signed and sealed this 22nd day of December 1970.

(SEAL)
Attest:

Edward M. Fletcher, Jr.
Attesting Officer

WILLIAM E. SCHUYLER, JR.
Commissioner of Patents